Patented Aug. 9, 1938

2,126,173

UNITED STATES PATENT OFFICE 2,126,173

NONCORROSIVE ANTIFREEZE LIQUID

Leo J. Clapsadle, Buffalo, N. Y., and Alvan H. Tenney, Pittsburgh, Pa., assignors, by mesne assignments, to Union Carbide and Carbon Corporation, a corporation of New York No Drawing. Application November 9, 1935, Serial No. 48,996

10 Claims. (Cl. 252—5)

The invention relates to new liquid compositions for use in fluid cooling systems, shock absorbers, hydraulic lifts, and the like. It has particular reference to new and useful inhibitors for the prevention of metal corrosion in fluid systems employing an alcohol as an anti-freeze medium.

Alcohols of common usage as a freezing point depressant include methanol, ethanol, propanol, or other mono-hydroxy alcohols, and the poly-hydroxy alcohols, such as ethylene glycol, propylene glycol, diethylene glycol, and glycerine. The invention is applicable to compositions containing any of these liquids, and where an alcohol is referred to in the specification and claims, it is intended to include all of the saturated aliphatic hydroxy compounds, or mixtures thereof. It is an object of the invention to provide an alcohol heat-transfer or fluid pressure medium, containing small inhibitor additions adapted to protect iron, copper, brass, solder, aluminum, and other metals, from corrosive action commonly induced in normal uses of such liquids. A further object is to effectively produce and maintain substantially non-corrosive conditions in a cooling fluid, where an alcohol may be employed in full strength, in mixture with other alcohols, or in a diluted solution with water.

We have found that a ternary mixture of an alkali metal nitrite, an aliphatic hydroxy alkylamine, and a weak acid component, each in very small concentrations, will accomplish this objective, and provide corrosion protection for all metals commonly employed in liquid cooling and pressure systems. The inhibitor composition is universally applicable in function with all of the known alcohol type anti-freeze liquids.

Sodium nitrite is an especially suitable salt for this purpose, and triethanolamine, monoethanolamine and diethanolamine, or mixtures of these three amines, are appropriate as an organic base material. The higher fatty acids, such as oleic, palmitic and stearic acid, or a weak inorganic acid, like boric acid, are preferred, as the acid constituent. Since the hydroxy alkylamine and the acid of this mixture will react in the alcohol solution to form a salt, addition of these two materials may be made either separately or in their salt composition, in compounding the original mixture. When triethanolamine and an acid are used, a volumetric ratio of about 3.5 parts of the amine to 1 part of the acid appear to give the most effective results, or as a substitute for this mixture, the addition of triethanolamine tetraborate is equally appropriate.

Only very small concentrations of each constituent are necessary, and while the most effective quantities may vary with different alcohols, the following range of inhibitors is representative of concentrations quite suitable for normal uses of any alcohol anti-freeze liquid.

|  | Percent by weight |
|---|---|
| Sodium nitrite | 0.05 to 2.0 |
| Triethanolamine | 0.1 to 2.0 |
| Palmitic acid | 0.05 to 1.0 | or

|  |  |
|---|---|
| Sodium nitrite | 0.05 to 2.0 |
| Triethanolamine tetraborate | 0.1 to 2.0 |

A complete anti-freeze composition, illustrative of the invention, contains an alcohol base of methyl or ethyl alcohol, or a mixture of about 95 parts of ethyl alcohol with about 5 parts of a glycol, such as ethylene glycol, diethylene glycol, propylene glycol, or mixtures of these. To this there is added, in percentage by weight of the alcohol, about 0.25% sodium nitrite, 0.55% triethanolamine, and 0.12% of palmitic acid. In the same composition, and with a similar amount of sodium nitrite, 0.1% to 2.0% by weight of triethanolamine tetraborate may be substituted for the triethanolamine and palmitic acid, with equally effective results.

This inhibitor mixture affords protection not only for iron, but for all other metals commonly used in fluid cooling and pressure systems. Each single constituent exerts, in itself, a certain inhibiting action, but the combination of the three components prevents corrosion to an extent quite impossible with any one of them alone. Discoloration of aluminum, a condition heretofore difficult to avoid in the presence of prior known inhibitors, is also prevented by this mixture, under all operating conditions. The inhibitors are soluble in alcohol of full strength, and in use as an anti-freeze, both in concentrated and diluted solution, a protective film appears to form on metal in contact therewith. This film will prevent atmospheric corrosion of surfaces in a cooling system which may, during operation, become exposed. The mixture functions substantially as well on surfaces contaminated with rust as it does on the clean metal, and no foaming is encountered in alcohols containing this inhibitor mixture. In the concentrations indicated, a pH value is maintained slightly on the alkaline side of neutral, a condition which is further effective in reducing corrosion.

It will be understood that this inhibitor mixture is suitable for use in all of the common anti-freeze alcohols, where they may be employed both individually and in mixtures of two or more. In an automobile cooling system the alcohol is usually diluted with water, and in any degree of aqueous dilution the inhibitor is equally effective. Other diluents, such as kerosene, and very small quantities of a dye, both of which are sometimes used in anti-freeze solutions, will not affect the inhibiting action.

Modification in the specific proportions cited, as well as in the preferred materials, can be made, and the most suitable inhibitor concentration for any particular alcohol base may be readily determined. The invention should not be limited other than as defined in the appended claims.

We claim:

1. A non-corrosive anti-freeze liquid comprising an alcohol and an inhibitor consisting of an additive mixture of an alkali metal nitrite, triethanolamine, and an acid of the group consisting of oleic, palmitic, stearic, and boric acids.

2. A non-corrosive anti-freeze liquid comprising an alcohol and an inhibitor consisting of an additive mixture of sodium nitrite, triethanolamine, and palmitic acid.

3. A non-corrosive anti-freeze liquid comprising an alchol and an inhibitor consisting of a mixture of sodium nitrite and triethanolamine tetraborate.

4. A non-corrosive anti-freeze liquid comprising an alcohol and an inhibitor consisting of an additive mixture of about 0.05% to 2.0% of sodium nitrite, about 0.1% to 2.0% of triethanolamine, and about 0.05% to .10% of palmitic acid.

5. A non-corrosive anti-freeze liquid comprising an alcohol and an inhibitor consisting of a mixture of about 0.05% to 2.0% sodium nitrite, and about 0.1% to 2.0% of triethanolamine tetraborate.

6. A non-corrosive anti-freeze liquid comprising an alcohol of the group consisting of methyl alcohol, ethyl alcohol and a mixture of about 95 parts of ethyl alcohol and about 5 parts of a glycol, and an inhibitor consisting of an additive mixture of about 0.25% sodium nitrite, about 0.55% triethanolamine, and about 0.12% palmitic acid.

7. A non-corrosive anti-freeze liquid comprising an alcohol of the group consisting of methyl alcohol, ethyl alcohol and a mixture of about 95 parts of ethyl alcohol and about 5 parts of a glycol, and an inhibitor consisting of a mixture of about 0.25% of sodium nitrite and about 0.60% triethanolamine borate.

8. Method of inhibiting corrosion of metal by an alcohol in contact therewith, which comprises contacting said alcohol with metal in the presence of an additive inhibitor mixture consisting of an alkali metal nitrite, triethanolamine, and an acid of the group consisting of oleic, palmitic, stearic and boric acids.

9. Method of inhibiting corrosion of metal by an alcohol in contact therewith, which comprises contacting said alcohol with metal in the presence of an additive inhibitor mixture consisting of about 0.05% to 2.0% sodium nitrite, about 0.10% to 2.0% triethanolamine, and about 0.05% to 1.0% of palmitic acid.

10. Method of inhibiting corrosion of metal by an alcohol in contact therewith, which comprises contacting said alcohol with metal in the presence of an inhibitor mixture consisting of about 0.05% to 2.0% of sodium nitrite, and about 0.10% to 2.0% of triethanolamine tetraborate.

LEO J. CLAPSADLE.
ALVAN H. TENNEY.